… … …

United States Patent Office 3,746,715
Patented July 17, 1973

3,746,715
N-SUBSTITUTED-5,6,7,8-TETRAHYDRO-7-METHYL-NAPHTHO-[2,3-d]-1,3-DIOXOLE - 5,6-DICARBOX-IMIDES
William F. Bruce, Havertown, Pa., assignor to American Home Products Corporation, New York, N.Y.
No Drawing. Filed July 1, 1971, Ser. No. 159,058
Int. Cl. C07d 99/04
U.S. Cl. 260—293.58          17 Claims

ABSTRACT OF THE DISCLOSURE

This invention discloses N-substituted-5,6,7,8-tetrahydro-7-methylnaphtho[2,3-d]-1,3-dioxole - 5,6 - dicarboximides and derivatives thereof including acid addition salts and quaternary ammonium compounds. The compounds have utility as central nervous system depressants useful in the calming of animals.

---

This invention relates to new and novel N-substituted-5,6,7,8-tetrahydro-7-methylnaphtho[2,3-d] - 1,3 - dioxole-5,6-dicarboximides having utility as central nervous system depressants useful in the calming of animals. Particularly, this invention concerns compounds having the above utility selected from the group consisting of those having the formula:

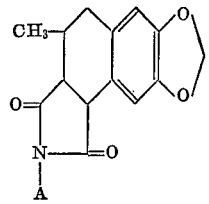

(I)

wherein A is selected from the group consisting of:

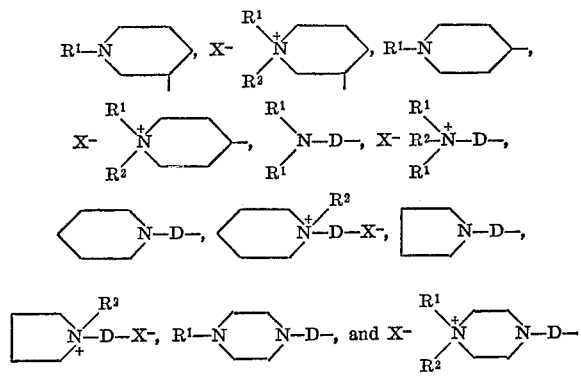

wherein $R^1$ is (lower)alkyl; $R^2$ is selected from the group consisting of (lower)alkyl and allyl; X is a halide anion; and D is (lower)alkylene of from about 2 to about 6 carbon atoms; and the non-toxic pharmaceutically acceptable acid addition salts thereof when A is other than quaternary ammonium containing.

More particularly, this invention concerns compounds of Formula I having the formula:

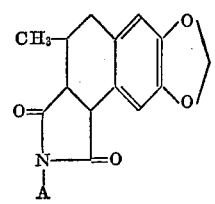

(II)

wherein A is selected from the group consisting of 1-(lower)alkyl-3-piperidyl, 1-(lower)alkyl-4-piperidyl and

B—D— wherein D is (lower)alkylene of from about 2 to about 6 carbon atoms and B is selected from the group consisting of di(lower)alkylamino, piperidino, pyrrolidino and 1-(lower)alkylpiperazino; and the non-toxic pharmaceutically acceptable acid addition salts thereof. Exemplary of the compounds of Formula II are:

N-[2-(dimethylamino)ethyl]-5,6,7,8-tetrahydro-7-methylnaphtho[2,3-d]-1,3-dioxole-5,6-dicarboximide;
N-[2-(diethylamino)ethyl]-5,6,7,8-tetrahydro-7-methylnaphtho[2,3-d]-1,3-dioxole-5,6-dicarboximide;
N-(1-ethyl-3-piperidinyl)-5,6,7,8-tetrahydro-7-methylnaphtho[2,3-d]-1,3-dioxole-5,6-dicarboximide;
N-[4-(dibutylamino)butyl]-5,6,7,8-tetrahydro-7-methylnaphtho[2,3-d]-1,3-dioxole-5,6-dicarboximide;
N-(2-dipropylaminoethyl)-5,6,7,8-tetrahydro-7-methylnaphtho[2,3-d]-1,3-dioxole-5,6-dicarboximide perchlorate;
N-(2-diisopropylaminoethyl)-5,6,7,8-tetrahydro-7-methylnaphtho[2,3-d]-1,3-dioxole-5,6-dicarboximide;
N-(2-dibutylaminoethyl)-5,6,7,8-tetrahydro-7-methylnaphtha[2,3-b]-1,3-dioxole-5,6-dicarboximide;
5,6,7,8-tetrahydro-7-methyl-N-(3-pyrrolidinopropyl)-naphtho[2,3-b]-1,3-dioxole-5,6-dicarboximide;
N-(2-diethylaminopropyl)-5,6,7,8-tetrahydro-7-methylnaphtho[2,3-b]-1,3-dioxole-5,6-dicarboximide;
5,6,7,8-tetrahydro-7-methyl-N-(2-pyrrolidinoethyl)naphtho[2,3-d]-1,3-dioxole-5,6-dicarboximide;
N-(2-dimethylamino-1-methylethyl)-5,6,7,8-tetrahydro-7-methylnaphtho[2,3-d]-1,3-dioxole-5,6-dicarboximide; and
N-(2-dimethylaminopropyl)-5,6,7,8-tetrahydro-7-methylnaphtho[2,3-b]-1,3-dioxole-5,6-dicarboximide.

More particularly, this invention also includes compounds of Formula I having the formula:

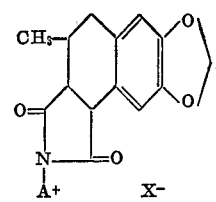

(III)

wherein X is a halide anion; and A is selected from the group consisting of (structures shown)

wherein $R^1$ is (lower)alkyl; $R^2$ is selected from the group consisting of (lower)alkyl and allyl; and D is (lower)

alkylene of from about 2 to about 6 carbon atoms. Exemplary of the compounds of Formula III are:

Allyldiethyl-[2-(5,6,7,8-tetrahydro-7-methylnaphtho-[2,3-d]-1,3-dioxole-5,6-dicarboximido)ethyl] ammonium bromide; and
1-methyl-1-ethyl-1-[3-(5,6,7,8-tetrahydro-7-methyl-naphtho-[2,3-d]-1,3-dioxole-5,6-dicarboximido)] piperidinium iodide.

This invention also concerns a new and novel process for the production of a compound of Formula II which comprises contacting a compound having the formula:

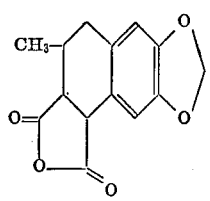

(IV)

i.e., 5,6,7,8 - tetrahydro - 7 - methyl - naphtho[2,3-d]-1,3-dioxole-5,6-dicarboxylic anhydride, with a compound selected from the group consisting of 1-(lower)alkyl-3-aminopiperidine, 1-(lower)alkyl-4-aminopiperidine and

wherein D and B are as set forth in Formula II, for a period ranging from about one minute to about twenty hours in a reaction inert organic solvent.

When used herein and in the appended claims, the term "(lower)alkyl" contemplates hydrocarbon radicals, straight and branched chain, containing from about 1 to about 6 carbon atoms, and includes methyl, ethyl, n-propyl, i-propyl, n-butyl, t-butyl, n-pentyl, n-hexyl, 2-methylpentyl, and the like. The term "halide ion" contemplates halogen-ions, and includes fluorine, chlorine, bromine and iodine. All temperatures herein and in the appended claims refer to degrees Celsius unless otherwise stated. The phrase "reaction inert organic solvent" refers to solvents, organic in nature, which dissolve the reactants without altering their chemical composition or the reaction taking place and include organic solvents such as toluene, dimethylformamide (DMF), dimethylsulfoxide (DMSO), tetrahydrofuran (THF), benzene; dioxane, chloroform, 1,2-dimethoxyethane and the like.

The reaction providing the herein disclosed compounds of Formula II takes place at the various times and temperatures disclosed, although most optimumly on a steam bath for two to six hours. However, certain of the disclosed reactions take place at room temperature almost instantaneously. The compounds of Formula III, quaternary nitrogn compounds, are provided from the respective compounds of Formula II by routine quaternizing procedures, i.e. treating the compound of Formula I in reaction inert organic solvent by heating (steam bath) with an appropriate alkyl or alkynyl halide to provide the compound of Formula III which is recovered by routine procedures, such as filtering out the compound formed and recrystallizing from a reaction inert organic solvent, if necessary. The compounds of Formula II when provided by the herein described methods are also recovered by routine procedures, such as diluting with water to form a precipitate which is filtered out and crystallized from an inert organic solvent (i.e. ethanol). Salts are provided by the routine treatment of the compounds with the appropriate salt forming acid (i.e. perchloric, hydrochloric and the like).

The starting material of Formula IV is obtained by the method of Bruckner [Ber 75, 2034, (1942)] using no solvent and reacting maleic anhydride and isosafrole according to the reaction:

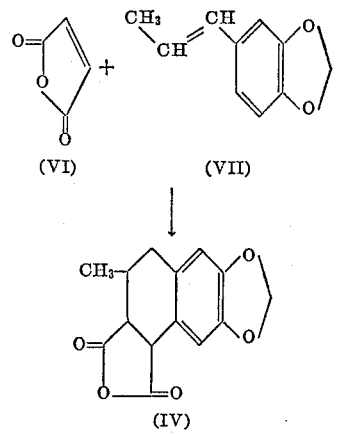

A quicker and easier to control method using a solvent, toluene is described by Hudson and Robinson, J.C.S. 1937, 1315. The 1-(lower)alkyl-3-aminopiperidines, 1-(lower)alkyl-4-aminopiperidines and the amines of Formula V are readily available or are prepared by methods well-known to those skilled in the art.

In accord with the present invention, the compounds of Formula I of the present invention have been found to possess interesting pharmacological properties. More particularly, these compounds, in standard pharmacological tests, have exhibited utility as central nervous system depressant agents which are useful in producing a calming effect on animals.

In the pharmacological evaluation of the central nervous system depressant compounds of Formula I of this invention the in vivo effects of the compounds of this invention are tested as follows:

The compound is administered intraperitoneally and/or orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharacol. Exper. Therap. 107, 385 (1953)] is used to test for analgesia. The experiment is terminated by subjecting each animal to a maximal electroshock to test for anti-convulsant activity.

The compounds of Formula I of this invention when administered intraperitoneally in the above test procedure induce decreased motor activity at a range of from 12.7 mg./kg. to 400.0 mg./kg. Similar results are obtained when these compounds are administered orally at a range of from 12.7 mg./kg. up to 400.0 mg./kg.

When the compounds of this invention are employed as central nervous system depressant agents to produce a calming effect they may be administered to warm-blooded animals, e.g., mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

N-(2-dimethylaminoethyl)-5,6,7,8-tetrahydro-7-methyl-naphthol[2,3-d]-1,3-dioxole-5,6-dicarboximide To 13 g. of isosafrole-maleic anhydride adduct (5,6,7,8-tetrahydro-7-methylnaphtho[2,3-d]-1,3 - dioxide - 5,6-dicarboxylic anhydride) (Bruckner, Ber 75, 2034) (1942)) in 30 ml. of dimethylformamide (DMF) is added 4.4 g. of dimethylaminoethylamine. Mild heat is given off and the solution is warmed two hours on a steam bath. On dilution with an equal volume of water, a yellow solid separates and is crystallized from ethanol to give 10 g. of white rosettes, M.P. 117–118° C.

*Analysis.*—Calcd. for $C_{18}H_{22}N_2O_4$ (percent): C, 65.44; H, 6.71; N, 8.48. Found (percent): C, 62.24; H, 6.40; N, 8.50.

EXAMPLE II

N-(2-diethylaminoethyl)-5,6,7,8-tetrahydro-7-methyl-naphtho[2,3-d]-1,3-dioxole-5,6-dicarboximide To 13 g. of isosafrole-maleic anhydride adduct (5,6,7,8-tetrahydro-7-methylnaphtho[2,3-d] - 1,3 - dioxole - 5,6-dicarboxylic anhydride) suspended in 30 ml. of DMF is added 6 g. of N,N-diethylethylene diamine. The solid dissolves with mild evolution of heat, and on addition to 30 ml. of water gives a yellow viscous oil which on standing solidifies. This material, crystallizes from ethanol, to give 9.5 g. of white crystalline solid, M.P. 85–86° C.

*Analysis.*—Calcd. for $C_{20}H_{26}N_2O_4$ (percent): C, 67.02; H, 7.31; N, 7.82. Found (percent): C, 66.73; H, 7.43; N, 7.53.

EXAMPLE III

N-(1-ethyl-3-piperidinyl)-5,6,7,8-tetrahydro-7-methyl-naphtho-[2,3-d]-1,3-dioxole-5,6-dicarboximide To 13 g. of isosafrole-maleic anhydride adduct (5,6,7,8 - tetrahydro-7-methylnaphtho[2,3-d]-1,3-dioxole-5,6-dicarboxylic anhydride) in 50 ml. of DMF is added 6.4 g. of N-ethyl-3-aminopiperidine. The suspended solid dissolves with mild evolution of heat and on addition of four volumes of water, the solution deposits a gummy yellow oil which soon solidifies. On crystallization from ethanol, this material gives 10 g. of white granular solid, M.P. 143–144° C.

*Analysis.*—Calcd. for $C_{21}H_{26}N_2O_4$ (percent): C, 68.09; H, 7.07; N, 7.56. Found (percent): C, 68.08; H, 7.00; N, 7.35.

In a similar manner, using the appropriate starting materials, are provided the following compounds:

N-(1-ethyl-4-piperidinyl)-5,6,7,8-tetrahydro-7-methyl-naphtho[2,3-d]-1,3-dioxole-5,6-dicarboxamide;
N-(1-hexyl-3-piperidinyl)-5,6,7,8-tetrahydro-7-methyl-naphtho[2,3-d]-1,3-dioxole-5,6-dicarboximide;
5,6,7,8-tetrahydro-7-methyl-N-(1-propyl-3-piperidinyl)-naphtho[2,3-d]-1,3-dioxole-5,6-dicarboximide;
5,6,7,8-tetrahydro-7-methyl-N-(1-isopropyl-4-piperidinyl) naphto[2,3-d]-1,3-dioxole-5,6-dicarboximide; and
5,6,7,8-tetrahydro-7-methyl-N-(1-pentyl-3-piperidinyl)-naphtho[2,3-d]-1,3-dioxole-5,6-dicarboximide.

EXAMPLE IV

N-(4-dibutylaminobutyl)-5,6,7,8-tetrahydro-7-methyl-naphtho-[2,3-d]-1,3-dioxole-5,6-dicarboximide To 13 g. of isosafrole-maleic anhydride adduct (5,6,7,8 - tetrahydro-7-methylnaphtho[2,3-d]-1,3-dioxole-5,6-dicarboxylic anhydride) suspended in 50 ml. of DMF is added 10 g. of 4-di-n-butylaminobutylamine. The solid at once dissolves with evolution of heat, and the solution after standing overnight is diluted with four volumes of water to give a yellow gum which solidifies and is crystallized from ethanol to give 9 g. of yellow-white solid, M.P. 82–83° C.

*Analysis.*—Calcd. for $C_{26}H_{38}N_2O_4$ (percent): C, 70.55; H, 8.65; N, 6.33. Found (percent): C, 70.26; H, 8.41; N, 6.45.

In a similar manner, using the appropriate starting materials, are provided:

N-(6-dihexylaminohexyl)-5,6,7,8-tetrahydro-7-methyl-naphtho[2,3-d]-1,3-dioxole-5,6-dicarboximide;
N-(4-dihexylaminobutyl)-5,6,7,8-tetrahydro-7-methyl-naphtho[2,3-d]-1,3-dioxole-5,6-dicarboximide; and
N-(6-dibutylaminohexyl)-5,6,7,8-tetrahydro-7-methyl-naphtho[2,3-d]-1,3-dioxole-5,6-dicarboximide.

EXAMPLE V

N-(2 - dipropylaminoethyl) - 5,6,7,8-tetrahydro-7-methyl-naphtho-[2,3-d]-1,3 - dioxole - 5,6-dicarboximide perchlorate To 5.2 g. of isosafrole-maleic anhydride adduct (5,6,7,8 - tetrahydro-7-methylnaphtho[2,3-d]-1,3-dioxole-5,6-dicarboxylic anhydride) suspended in 30 ml. of DMF is added 3 g. of N,N-di-n-propylethylenediamine. The solid dissolves with mild heat of reaction and the solution is warmed overnight on a steam bath. After addition of five volumes of water the product is extracted with ether and neutralized with percholric acid to give a yellow precipitate (6.5 g.) which is recrystallized from 70% alcohol. This product, 4.5 g., melts at 168–169° C.

*Analysis.*—Calcd. for $C_{22}H_{31}ClN_2O_8$ (percent): C, 54.26; H, 6.42; Cl, 7.28; N, 5.75. Found (percent): C, 54.20; H, 5.98; Cl, 7.2; N, 5.75.

EXAMPLE VI

N-(2-diisopropylaminoethyl)-5,6,7,8-tetrahydro-7-methylnaphtho[2,3-d]-1,3-dioxole-5,6-dicarboximide To a suspension of 10 g. of isosafrole-maleic anhydride adduct (5,6,7,8 - tetrahydro-7-methylnaphtho[2,3-d]-1,3-dioxole-5,6-dicarboxylic anhydride) in 30 ml. of DMF is added 6 g. of di-isopropylaminoethylamine. The solid soon dissolves with heat of reaction; the solution is heated for six hours on a steam bath and then diluted to 100 ml., precipitating a viscous oil which solidifies on standing overnight. Recrystallization from ethanol gives 7 g. of fluffy white crystals, M.P. 91–92° C.

*Analysis.*—Calcd. for $C_{22}H_{30}N_2O_4$ (percent): C, 68.36; H, 7.82; N, 7.25. Found (percent): C, 68.39; H, 7.65; N, 7.45.

EXAMPLE VII

N-(2-dibutylaminoethyl)-5,6,7,8-tetrahydro-7-methyl-naphtho-[2,3-d]-1,3-dioxole-5,6-dicarboximide To 6 g. of isosafrole-maleic anhydride adduct (5,6,7,8-tetrahydro-7-methylnaphtho[2,3-d]-1,3-dioxole-5,6-dicarboxylic anhydride) suspended in 25 ml. of DMF is added 4.5 ml. of di-n-butylaminoethylamine in 10 ml. of DMF. The resulting solution is heated six hours on a steam bath, then diluted to 200 ml. with water to precipitate a viscous yellow oil which is washed with water, dissolved in alcohol, and crystallized by seeding to give 6 g. of pale yellowish-white solid, M.P. 79–80° C.

*Analysis.*—Calcd. for $C_{24}H_{34}N_2O_4$ (percent): C, 69.54; H, 8.27; N, 6.76. Found (percent): C, 69.70; H, 8.22; N, 6.82.

EXAMPLE VIII 5,6,7,8-tetrahydro-7-methyl-N-(3-pyrrolidinopropyl) naphtho[2,3-*d*]-1,3-dioxole-5,6-dicarboximide To 7.8 g. of isosafrole-maleic anhydride adduct (5,6,7,8 - tetrahydro-7-methylnaphtho[2,3-*d*]-1,3-dioxole-5,6-dicarboxylic anhydride) suspended in 30 ml. of DMF is added 5 g. of 3-pyrrolidinopropylamine in 10 ml. of DMF. After one hour on a steam bath, the solution is cooled and diluted to 125 ml. with water, throwing out a viscous yellow oil, which is washed with water and dissolved in ethanol, from which it crystallizes as a yellow-white powder, M.P. 98–99° C.; yielding 5.5 g.

*Analysis.*—Calcd. for $C_{21}H_{26}N_2O_4$ (percent): C, 68.08; H, 7.08; N, 7.56. Found (percent): C, 67.70; H, 6.74; N, 7.68.

In a similiar manner, using the appropriate starting materials, the following compounds are provided:

5,6,7,8-tetrahydro-7-methyl-N-(6-pyrrolidinohexyl)-naphtho[2,3-*d*]-1,3-dioxole-5,6-dicarboximide;
5,6,7,8-tetrahydro-7-methyl-N-(3-pyrrolidino-1-ethylpropyl)naphtho[2,3-*d*]-1,3-dioxole-5,6-dicarboximide; and
5,6,7,8-tetrahydro-7-methyl-N-(4-pyrrolidino-3-methylbutyl)naphtho[2,3-*d*]-1,3-dioxole-5,6-dicarboximide.

EXAMPLE IX

N-(2-diethylaminopropyl)-5,6,7,8-tetrahydro-7-methylnaphtho[2,3-*d*]-1,3-dioxole-5,6-dicarboximide To a suspension of 7.8 g. of isosafrole-maleic anhydride adduct (5,6,7,8-tetrahydro-7-methylnaphtho[2,3-*d*]-1,3-dioxole-5,6-dicarboxylic anhydride) in 30 ml. of DMF is added 4.1 ml. of 2-diethylaminopropylamine. The solution is warmed overnight on a steam bath and diluted with 125 ml. of water to give a sticky yellow gum. This is washed with water and dissolved in ethanol. On standing overnight at —10° C., the solution deposits 2.5 g. of pale yellow powder, M.P. 92–93° C.

*Analysis.*—Calcd. for $C_{21}H_{28}N_2O_4$ (percent): C, 67.72; H, 7.58; N, 7.52. Found (percent): C, 67.82; H, 7.31; N, 7.37.

EXAMPLE X 5,6,7,8-tetrahydro-7-methyl-N-(2-pyrrolidinoethyl) naphtho[2,3-*d*]-1,3-dioxole-5,6-dicarboximide To a suspension of 8 g. of isosafrole-maleic anhydride adduct (5,6,7,8 - tetrahydro - 7 - methylnaphtho[2,3-*d*]-1,3-dioxole-5,6-pyrrolidinoethylamine. The solution, after two hours on a steam bath, is diluted with 125 ml. of water to give a yellow gum which solidifies, is washed with water and crystallized from ethanol to give 5 g. of pale yellow crystalline powder, M.P. 97–98° C.

*Analysis.*—Calcd. for $C_{20}H_{24}N_2O_4$ (percent): C, 67.39; H, 6.79; N, 7.86. Found (percent): C, 67.51; H, 6.59; N, 7.70.

EXAMPLE XI

N-(2-dimethylamino-1-methylethyl)-5,6,7,8-tetrahydro-7-methylnaphtho[2,3-*d*]-1,3-dioxole-5,6-dicarboximide To a suspension of 13 g. of isosafrole-maleic anhydride adduct (5,6,7,8-tetrahydro - 7 - methylnaphtho[2,3-*d*]-1,3-dioxole-5,6-dicarboxylic anhydride) in 50 ml. of DMF is added 5 ml. of N',N'-dimethyl - 1,2 - propanediamine. After two hours on a steam bath the solution is diluted with 125 ml. of water to throw out a viscous oil, which is washed with water and dissolved in ethanol. This solution is filtered hot several times to remove a persistent turbidity; on cooling, 7 g. of nearly white rosettes separate, M.P. 121–122° C.

*Analysis.*—Calcd. for $C_{19}H_{24}N_2O_4$ (percent): C, 66.26; H, 70.2; N, 8.14. Found (percent): C, 66.02; H, 6.92; N, 7.91.

EXAMPLE XII

N-(2-dimethylaminopropyl)-5,6,7,8-tetrahydro-7-methylnaphtho[2,3-*d*]-1,3-dioxole-5,6-dicarboximide To a suspension of 9 g. of isosafrole-maleic anhydride adduct (5,6,7,8-tetrahydro - 7 - methylnaphtho[2,3-*d*]-1,3-dioxole-5,6-dicarboxylic anhydride) in 25 ml. of DMF is added 4.5 ml. of $N^2,N^2$-dimethyl-1,2-propanediamine. The solution, after five hours on a steam bath, is diluted with water to give a sticky gum, which is washed with water and dissolved in ethanol. After several days, 3 g. of pale yellow crystals separates, M.P. 125–126° C.

*Analysis.*—Calcd. for $C_{19}H_{24}N_2O_4$ (percent): C, 66.26; H, 7.02; N, 8.14. Found (percent): C, 66.08; H, 6.87; N, 8.17.

EXAMPLE XIII 5,6,7,8-tetrahydro-7-methyl-N-(3-piperidinopropyl) naphtho[2,3-*d*]-1,3-dioxole-5,6-dicarboximide To 8.0 g. of isosafrole-maleic anhydride adduct (5,6,7,8-tetrahydro - 7 - methylnaphtho[2,3-*d*] - 1,3 - dioxole-5,6-dicarboxylic anhydride) suspended in 30 ml. of DMF is added 5.0 g. of 3-piperidinopropylamine in 10 ml. of DMF. After two hours on a steam bath, the solution is cooled and diluted to 125 ml. with water, throwing out crystals which are filtered, washed with water and crystallized from ethanol.

In a similar manner, using the appropriate starting materials, are provided:

5,6,7,8-tetrahydro-7-methyl-N-(5-piperidinopentyl)-naphtho[2,3-*d*]-1,3,-dioxole-5,6-dicarboximide;
5,6,7,8-tetrahydro-7-methyl-N-(2-piperidinopropyl)-naphtho[2,3-*d*)-1,3-dioxole-5,6-dicarboximide; and
5,6,7,8-tetrahydro-7-methyl-N-(2-piperidinoethyl)-naphtho[2,3-*d*]-1,3-dioxole-5,6-dicarboximide.

EXAMPLE XIV

N-[2-(N-ethylpiperazino)ethyl]-5,6,7,8-tetrahydro-7-methylnaphtho[2,3-*d*]-1,3-dioxole-5,6-dicarboximide To a suspension of 8.5 g. of isosafrole-maleic anhydride adduct (5,6,7,8-tetrahydro-7-methylnaphtho[2,3-*d*] - 1,3-dioxole-5,6-dicarboxylic anhydride) in 30 ml. of DMF is added 5.2 g. of 2-(N-ethylpiperazino)ethylamine in 10 ml. of DMF. After three hours on a steam bath, the solution is cooled and diluted to 125 ml. with water throwing out crystals which are washed and crystallized from ethanol.

In a similar manner, using the approximate starting materials, the following compounds are provided:

5,6,7,8-tetrahydro-7-methyl-N-[2-(N-propylpiperazino)-ethyl]naphtho[2,3-*d*]-1,3-dioxole-5,6-dicarboximide;
5,6,7,8-tetrahydro-7-methyl-N-[6-(N-methylpiperazino)-hexy]naphtho[2,3-*d*]-1,3-dioxole-5,6-dicarboximide; and
N-[3-(N-hexylpiperazino)propyl]-5,6,7,8-tetrahydro-7-methylnaphtho[2,3-*d*]-1,3-dioxole-5,6-dicarboximide.

EXAMPLE XV

Allydiethyl[2 - (5,6,7,8 - tetrahydro-7-methylnaphtho[2,3,*d*]-1,3-dioxole - 5, 6 - dicarboximido)ethyl]ammonium bromide To 3 g. of N-[2-(diethylamino)ethyl]-5,6,7,8-tetrahydro-7-methylnaphtho[2,3-*d*] - 1,3 - dioxole - 5,6 - dicarboximide (Example II) in 15 ml. of toluene is added 3 ml. of allyl bromide and the solution is heated overnight on a steam bath. The solution soon becomes cloudy and by morning 5 g. of powder, M.P. 210–11° C. has separated and is recrystallized from ethanol to give 3 g. of white granular solid, M.P. 229–230° C.

*Analysis.*—Calcd. for $C_{23}H_{31}BrN_2O_4$ (percent): C, 57,62; H, 6.52; Br, 16.67; N, 5.85. Found (percent): C, 56.78; H, 6.24; Br, 17.2; N, 6.04.

9

In a similar manner, using the appropriate starting materials, the following compounds are provided:

[2-(5,6,7,8-tetrahydro-7-methylnaphtho[2,3-d]-1,3-dioxole-5,6-dicarboximido)ethyl]trimethylammonium iodide;

dibutylethyl[4-(5,6,7,8-tetrahydro-7-methylnaphtho[2,3-d]-1,3-dioxole-5,6-dicarboximido)butyl]ammonium bromide;

[2-(5,6,7,8-tetrahydro-7-methylnaphtho[2,3-d]-1,3-dioxole-5,6-dicarboximido)ethyl]tripropylammonium iodide;

allyl[2-(5,6,7,8-tetrahydro-7-methylnaphtho[2,3-d]-1,3-dioxole-5,6-dicarboximido)ethyl]diisopropylammonium bromide;

dibutyl[2-(5,6,7,8-tetrahydro-7-methylnaphtho[2,3-d]-1,3-dioxole-5,6-dicarboximido)ethyl]methylammonium iodide;

triethyl[2-(5,6,7,8-tetrahydro-7-methylnaphtho[2,3-d]-1,3-dioxole-5,6-dicarboximido)-1-methylethyl]ammonium bromide;

dimethyl[2-(5,6,7,8-tetrahydro-7-methylnaphtho[2,3-d]-1,3-dioxole-5,6-dicarboximido)propyl]propylammonium iodide; and allyl[2-(5,6,7,8-tetrahydro-7-methyl-naphtho[2,3-d]-1,3-dioxole-5,6-dicarboximido)-1-methylethyl]dimethylammonium bromide.

EXAMPLE XVI 1-methyl - 1 - ethyl - 1 - [3-(5,6,7,8-tetrahydro-7-methylnaphtho[2,3-d]-1,3-dioxole - 5,6 - dicarboximido)]piperidinium iodide To 4 g. of N-(1-ethyl-3-piperidinyl)-5,6,7,8-tetrahydro-7-methylnaphtho[2,3-d]-1,3-dioxole - 5,6 - dicarboximide (Example III) in 20 ml. of toluene, dissolved by heating on a steam bath, is added 4 ml. of methyl iodide. Immediate cloudiness appeares, and after fifteen minutes on the steam bath the flask is filled with crystals, giving 6 g. of bright yellow granular solid melting at 200–202° C. with decomposition.

*Analysis.*—Calcd. for $C_{22}H_{29}IN_2O_4$ (percent): C, 51.57; H, 5.70; N, 5.47. Found (percent): C, 51.80; H, 5.79; N, 5.51.

In a similar manner, using the appropriate starting materials, the following compounds are provided:

1-allyl-1-[3-(5,6,7,8-tetrahydro-7-methylnaphtho[2,3-d]-1,3-dioxole-5,6-dicarboximido)propyl]-1-pyrrolidinium bromide;

1-[2-(5,6,7,8-tetrahydro-7-methylnaphtho[2,3-d]-1,3-dioxole-5,6-dicarboximido)ethyl]-1-methyl-1-pyrrolidinium iodide;

1-ethyl-1-[3-(5,6,7,8-tetrahydro-7-methylnaphtho[2,3-d]-1,3-dioxole-5,6-dicarboximido)propyl]-1-piperidinium bromide; and 1-ethyl-1-[4-(5,6,7,8-tetrahydro-7-methylnaphtho[2,3-d]-1,3-dioxole-5,6-dicarboximido)ethyl]piperazinium-1-propyl iodide.

What is claimed is:

1. A compound selected from the group consisting of those having the formula:

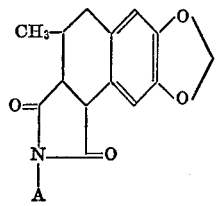

wherein A is selected from the group consisting of

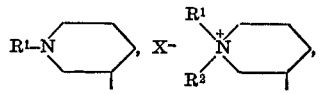

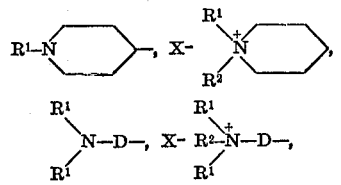

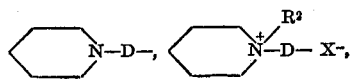

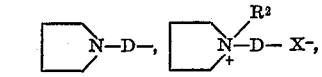

wherein $R^1$ is (lower)alkyl; $R^2$ is selected from the group consisting of (lower)alkyl and allyl; X is a halide anion; and D is (lower)alkylene of from about 2 to about 6 carbon atoms; and the non-toxic pharmaceutically acceptable acid addition salts thereof when A is other than quaternary ammonium containing.

2. A compound as set forth in claim 1 selected from the group consisting of those having the formula:

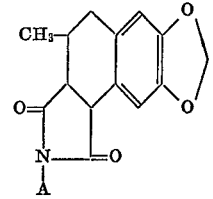

wherein A is selected from the group consisting of 1-(lower)alkyl-3-piperidyl, 1-(lower)alkyl-4-piperidyl and

B—D— wherein D is lower)al(kylene of from about 2 to about 6 carbon atoms and B is selected from the group consisting of di(lower)alkylamino, piperidino, pyrrolidino and 1-(lower)alkylpiperazino; and the non-toxic pharmaceutically acceptable acid addition salts thereof.

3. A compound as set forth in claim 2, which is: N-[2-(dimethylamino)ethyl] - 5,6,7,8 - tetrahydro - 7 - methylnaphtho[2,3-d]-1,3-dioxole-5,6-dicarboximide.

4. A compound as set forth in claim 2, which is: N - [2 - (diethylamino)ethyl] - 5,6,7,8 - tetrahydro - 7-methylnaphtho[2,3-d]-dioxole-5,6-dicarboximide.

5. A compound as set forth in claim 2, which is: N - (1 - ethyl - 3 - piperidinyl) - 5,6,7,8 - tetrahydro - 7-methylnaphtho[2,3-d]-1,3-dioxole-5,6-dicarboximide.

6. A compound as set forth in claim 2, which is: N - [4 - (dibutylamino)butyl] - 5,6,7,8 - tetrahydro - 7-methylnaphtho[2,3-d]-1,3-dioxole-5,6-dicarboximide.

7. A compound as set forth in claim 2, which is: N - (2 - dipropylaminoethyl) - 5,6,7,8 - tetrahydro - 7-methylnaphtho[2,3-d] - 1,3 - dioxole-5,6-dicarboximide perchlorate.

8. A compound as set forth in claim 2, which is: N - (2 - diisopropylaminoethyl) - 5,6,7,8 - tetrahydro - 7-methylnaphtho[2,3-d]-1,3,-dioxole-5,6-dicarboximide.

9. A compound as set forth in claim 2, which is: N - (2 - dibutylaminoethyl) - 5,6,7,8 - tetrahydro - 7-methylnaphtho[2,3-d]-1,3-dioxole-5,6-dicarboximide.

10. A compound as set forth in claim 2, which is: 5,6,7,8 - tetrahydro - 7 - methyl - N - (3-pyrrolidinopropyl)naphtho[2,3-d] - 1,3 - dioxole-5,6-dicarboximide.

11. A compound as set forth in claim 2, which is: N - (2 - diethylaminopropyl) - 5,6,7,8 - tetrahydro - 7-methylnaphtho[2,3-d] - 1,3 - dioxole-5,6-dicarboximide.

12. A compound as set forth in claim 2, which is: 5,6,7,8 - tetrahydro - 7 - methyl - N - (2 - pyrrolidinoethyl)naphtho[2,3-d] - 1,3 - dioxole - 5,6-dicarboximide.

13. A compound as set forth in claim 2, which is: N - (2 - dimethylamino - 1 - methylethyl) - 5,6,7,8 - tetrahydro - 7 - methylnaphtho[2,3-$d$] - 1,3-dioxole-5,6-dicarboximide.

14. A compound as set forth in claim 2, which is: N - (2 - dimethylaminopropyl) - 5,6,7,8 - tetrahydro - 7-methylnaphtho[2,3-$d$] - 1,3-dioxole - 5,6-dicarboximide.

15. A compound as set forth in claim 1 selected from the group consisting of those having the formula:

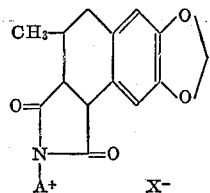

wherein X is a halide anion; and A is selected from the group consisting of

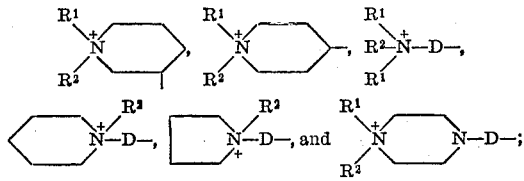

wherein $R^1$ is (lower)alkyl; $R^2$ is selected from the group consisting of (lower)alkyl and allyl; and D is (lower)alkylene of from about 2 to about 6 carbon atoms.

16. A compound as set forth in claim 15, which is: allyldiethyl[2 - (5,6,7,8 - tetrahydro - 7-methylnaphtho[2,3-$d$] - 1,3 - dioxole-5,6 - dicarboximido ethyl]ammonium bromide.

17. A compound as set forth in claim 15, which is: 1 - methyl - 1 - ethyl-1-[3-(5,6,7,8-tetrahydro-7-methylnaphtho[2,3-$d$] - 1,3 - dioxole-5,6-dicarboximido)]piperidinium iodide.

References Cited
UNITED STATES PATENTS

| | | | |
|---|---|---|---|
| 3,549,655 | 12/1970 | Bublitz | 260—326.5 |
| 3,135,749 | 6/1964 | Clinton et al. | 260—247.2 |
| 3,171,839 | 3/1965 | Rorig | 260—294 |

HENRY R. JILES, Primary Examiner

G. T. TODD, Assistant Examiner

U.S. Cl. X.R.

260—268 PH, 326 C, 340.5; 424—250, 267, 274